(12) United States Patent
Graage

(10) Patent No.: US 6,296,957 B1
(45) Date of Patent: Oct. 2, 2001

(54) ENERGY SUPPLY UNIT ON BOARD AN AIRCRAFT

(75) Inventor: Klaus Graage, Ulm (DE)

(73) Assignee: Xcellsis GmbH, Kirchheim/Teck-Nabern (DE)

(*) Notice: Subject to any disclaimer, the term of this patent is extended or adjusted under 35 U.S.C. 154(b) by 0 days.

(21) Appl. No.: 09/312,885

(22) Filed: May 17, 1999

(30) Foreign Application Priority Data

May 15, 1998 (DE) ................................................ 198 21 952

(51) Int. Cl.⁷ .............................. H01M 8/06; B64D 41/00
(52) U.S. Cl. ................................ 429/12; 429/13; 429/20; 244/58
(58) Field of Search ................................ 429/12, 20, 34, 429/13; 244/53 R, 58

(56) References Cited

U.S. PATENT DOCUMENTS

| | | | |
|---|---|---|---|
| 3,847,672 | * | 11/1974 | Trocciola et al. . |
| 4,684,081 | * | 8/1987 | Cronin .................................. 244/58 |
| 5,005,787 | | 4/1991 | Cullingford ......................... 244/163 |
| 5,069,985 | | 12/1991 | Cohen et al. ......................... 429/26 |
| 5,106,035 | * | 4/1992 | Langford ...................... 244/53 R X |
| 5,198,311 | | 3/1993 | Nakazawa et al. ................... 429/20 |
| 5,518,205 | * | 5/1996 | Wurst .................................... 244/58 |
| 5,939,800 | * | 8/1999 | Artinian et al. .............. 244/53 R X |
| 5,942,350 | * | 8/1999 | Roy et al. ......................... 429/34 X |

FOREIGN PATENT DOCUMENTS

| | | |
|---|---|---|
| 38 32 471 A1 | 3/1990 | (DE) . |
| 40 01 684 A1 | 7/1991 | (DE) . |
| 40 09 772 A1 | 10/1991 | (DE) . |
| 196 00 936 A1 | 8/1996 | (DE) . |
| 297 19 045 | 4/1998 | (DE) . |

* cited by examiner

Primary Examiner—Stephen Kalafut
(74) Attorney, Agent, or Firm—Crowell & Moring LLP

(57) ABSTRACT

An energy supply unit on board on aircraft comprises a fuel cell (1) as an energy converter for generating electrical energy to power various aircraft electrical systems.

13 Claims, 3 Drawing Sheets

ENERGY SUPPLY UNIT ON BOARD AN AIRCRAFT

BACKGROUND AND SUMMARY OF THE INVENTION

This application claims the priority of 198 21 952.0, filed May 15, 1998, the disclosure of which is expressly incorporated by reference herein.

The invention relates to an energy supply unit for use on board an aircraft, particularly a passenger plane.

Normally, the following energy sources exist on board a passenger plane:

Main Power Unit Generator

The main power units of an airplane are used primarily to generate a thrust to propel the airplane. In addition, however, they also supply compressed air for the air conditioner and power for a power generator which energizes the electrical system of the airplane. The main power units are supplied with fuel by the fuel system of the airplane.

Auxiliary Power Unit (APU)

In airplanes, a gas turbine—the auxiliary power unit (APU)—situated in the rear of the airplane supplies the airplane current and compressed air for the air conditioner and for starting the engines. It is used on the ground as well as during the flight (for example, when starting/landing or in emergency situations). The APU is supplied with fuel by the fuel system of the airplane. In addition to generating compressed air for the air conditioner and the power unit start per integrated compressor, the APU drives a generator for generating power.

Ram Air Turbine (RAT)

An air turbine situated in the fuselage of an airplane can be moved out into the flow around the fuselage. In an emergency (such as failure of the airplane hydraulic system), by means of a coupled hydraulic pump it supplies a hydraulic system of the airplane which is sufficiently dimensioned for emergency landings. On average, this RAT is used 1 to 3 times per useful life of the airplane (25 years). Because of the dependence on the aerodynamic flow around the fuselage, its reliability is currently somewhat problematic.

NiCd-Battery

A NiCd battery packet is used to supply power to the airplane electrical system. At the time of the start of the airplane operation, this packet is used for the first self-sufficient electric energy supply on board.

Compressed Air for Driving a Compressor/Expander Unit for the Air Conditioning within the On-Board Air Conditioning System The air-conditioning system in an air plane is switched on during all flight and ground standing times. This air-conditioning system is supplied with hot compressed air from the main power units or from the auxiliary power unit (APU). Air conditioning is performed by cooling with external air, a compressor/expander unit and a water extraction unit. The energy source for the operation of the compressor/expander unit is the compressed air coming from the main power unit or the auxiliary power unit.

German Patent Document DE 40 01 684 A1 discloses a hybrid system for driving a vehicle which comprises, in addition to an accumulator, a fuel cell as an energy supply unit.

German Patent Document DE 38 32 471 A1 discloses a fuel cell system with a freely movable electrolyte which is designed for use in zero gravity, such as in space travel.

The use of fuel cells in aviation is disclosed in German Patent Documents DE 196 00 936 A1 as well as DE 40 09 772 A1. In both cases, the electric energy generated by the fuel cell is used to drive the aircraft. However, these documents do not disclose information concerning the construction of the fuel cell system or the manner of its integration into the aircraft.

It is an object of the invention to provide an energy supply unit for use in an airplane which, in comparison to the conventional systems mentioned in the introduction to the specification, has an improved efficiency while the pollution and noise emissions are reduced.

This and other objects and advantages are achieved by the energy supply unit according to the invention, which comprises a fuel cell, particularly a Proton Exchange Membrane (PEM) fuel cell, as a power converter for generating direct current. A hydrocarbon can be used as fuel for the fuel cell and is converted to hydrogen in a reformer. However, it is also possible to carry along hydrogen in a container in the aircraft and to feed it directly to the fuel cell. The latter arrangement is particularly suitable for a hydrogen plane (currently being designed), in which hydrogen is stored in the aircraft anyhow.

Particularly in comparison to gas generators as energy converters, the advantages of the invention are as follows:

low to nil pollutant emissions lower generated noise higher efficiency lower system costs lower wear and therefore lower maintenance expenditures.

The invention is suitable for all types of aircraft; however, it is particularly suited for passenger planes and large-capacity passenger planes.

Advantageous further developments of the energy supply unit according to the invention on board an aircraft are particularly the following.

Main Power Unit Generator

The previously used gas powered generator (energy conversion: current from fuel) is replaced by a PEM fuel cell. Both a hydrocarbon (to be converted to hydrogen by a reformer in the gas generating system) and hydrogen can be used as fuels. The required air is taken from the power unit or from the outgoing cabin air. The direct current produced in the fuel cell is converted by means of an inverter into alternating current with the voltage (110V) normally used in the airplane, and is made available to the on-board power system.

By replacing the gas generators with fuel cells, the on-board current is generated with a significantly higher efficiency because 1. the fuel is converted directly to current, and 2. the efficiency of gas turbines is relatively poor.

This results in a lower fuel consumption and thus in a possible saving of weight when the fuel is carried along as well as in lower emissions.

Auxiliary Power Unit (APU)

The previously used gas generator (energy conversion: compressed air and current from fuel) is replaced by a PEM fuel cell. Both a hydrocarbon (converted to hydrogen by a reformer in the gas generating system) and hydrogen can be used as fuels. A portion of the direct current produced in the fuel cell is changed by means of an inverter into alternating current, with a voltage (110 V) normally used in the airplane, and is made available to the on-board power system.

Another portion is made available either as direct current or, by means of an inverter, as alternating current, to an electric motor which, in turn, drives a compressor. The required air is taken from the outgoing air (approximately 0.7 bar) of the cabin. The compressor supplies the air required for the air-conditioning system and the power unit.

The advantages achieved by replacing the gas generator in the APU by fuel cells, are the same as for the main power, as described above Ram Air Turbine (RAT)

This energy converter (energy conversion: aerodynamic power from flow around the outside) is replaced by a PEM fuel cell drive. Both a hydrocarbon (converted to hydrogen by a reformer in the gas generating system) and hydrogen can be used as fuels. The required air is taken from the outgoing cabin air. The direct current produced in the fuel cell is converted by means of an inverter into alternating current with the voltage (110V) normally used in an airplane, and will then drive a hydraulic pump and/or supply the on-board power system.

By replacing the RAT by fuel cells, hydraulic energy or on-board current is generated in an operationally reliable manner. In addition, this system may also contribute to covering possibly occurring demand peaks in the on-board energy supply and thus represent another independent system for generating on-board current.

NiCd Battery

This energy converter (electric current from chemically stored energy) is replaced by a PEM fuel cell. Both a hydrocarbon (converted to hydrogen by a reformer in the gas generating system) and hydrogen can be used as fuels. The direct current produced in the fuel cell is changed by means of an inverter into alternating current, with the voltage (110V) normally used in the airplane, and is made available to the on-board power system. By replacing the batteries by fuel cells, the on-board current is generated with a significantly higher efficiency and it is no longer necessary to recharge the batteries so that the availability of this energy generator is increased.

Drive of a Compressor/Expander Unit for the Air-Conditioning within the On-Board Air-Conditioning System The driving energy required for the air-conditioning system (compressed air which was generated by the gas turbine and drives a Komprex) is generated according to the invention by means of a PEM fuel cell. Both a hydrocarbon (converted to hydrogen by a reformer in the gas generating system) and hydrogen can be used as fuels. The generated electric power is made available to an electric motor either as direct current or, by way of an inverter, as alternating current. The electric motor, in turn, drives a compressor used in the air-conditioning system. The air required to operate the fuel cell is taken from the outgoing cabin air (approximately 0.7 bar). The required fresh air can be taken from the outside air by means of the compressor, for example, by way of a separate pipe and an inlet in the airplane shell. The compressor will then supply compressed air for the air-conditioning system. In emergencies, a portion of the direct current produced in the fuel cell can be converted by means of an inverter into an alternating current with the voltage (110V) normally used in an airplane, and is made available to the on-board power system.

By supplying power to the air-conditioning system by means of fuel cells, power is generated at the site with a significantly higher efficiency than by means of an APU or a main power unit because 1. the efficiency of gas turbines is relatively poor and the FCE efficiency is very good;

2. the energy conversion chain is now much simpler.

This leads to a lower fuel consumption and thus to a possible saving of weight when fuel is carried along as well as to lower emissions.

Emergency Locator Transmitter ELT

For finding an aircraft after an emergency, airplanes contain a battery-operated ELT. In order to prolong the operating time (radio transmission time) of this system, a fuel cell system can be used, including a fueling system and an air supply system.

Other objects, advantages and novel features of the present invention will become apparent from the following detailed description of the invention when considered in conjunction with the accompanying drawings.

DETAILED DESCRIPTION OF THE INVENTION

Figure 1:
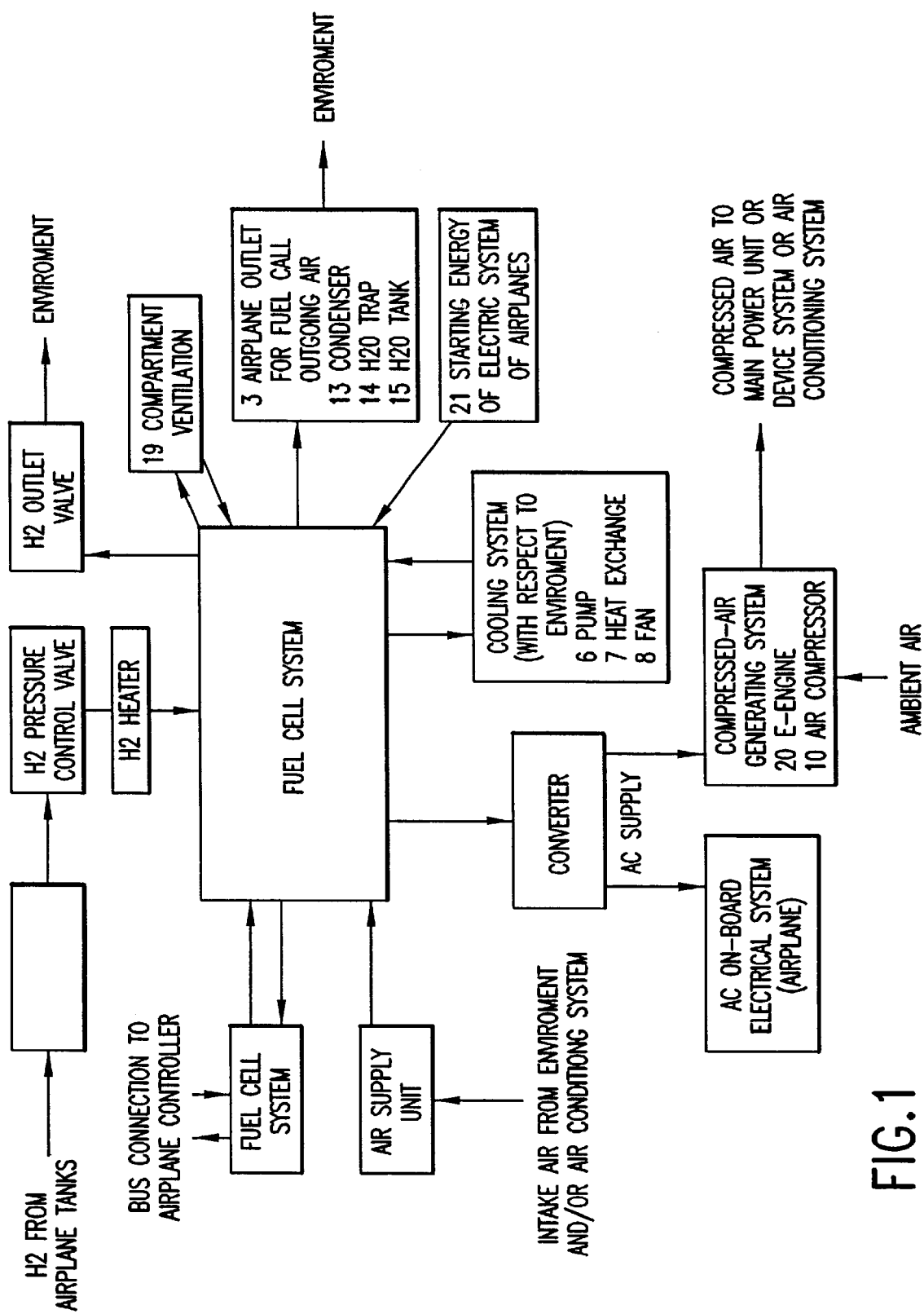
FIG. 1 is a functional block diagram of an energy supply system according to the invention, in the form of an auxiliary power unit (APU)
Figure 2:
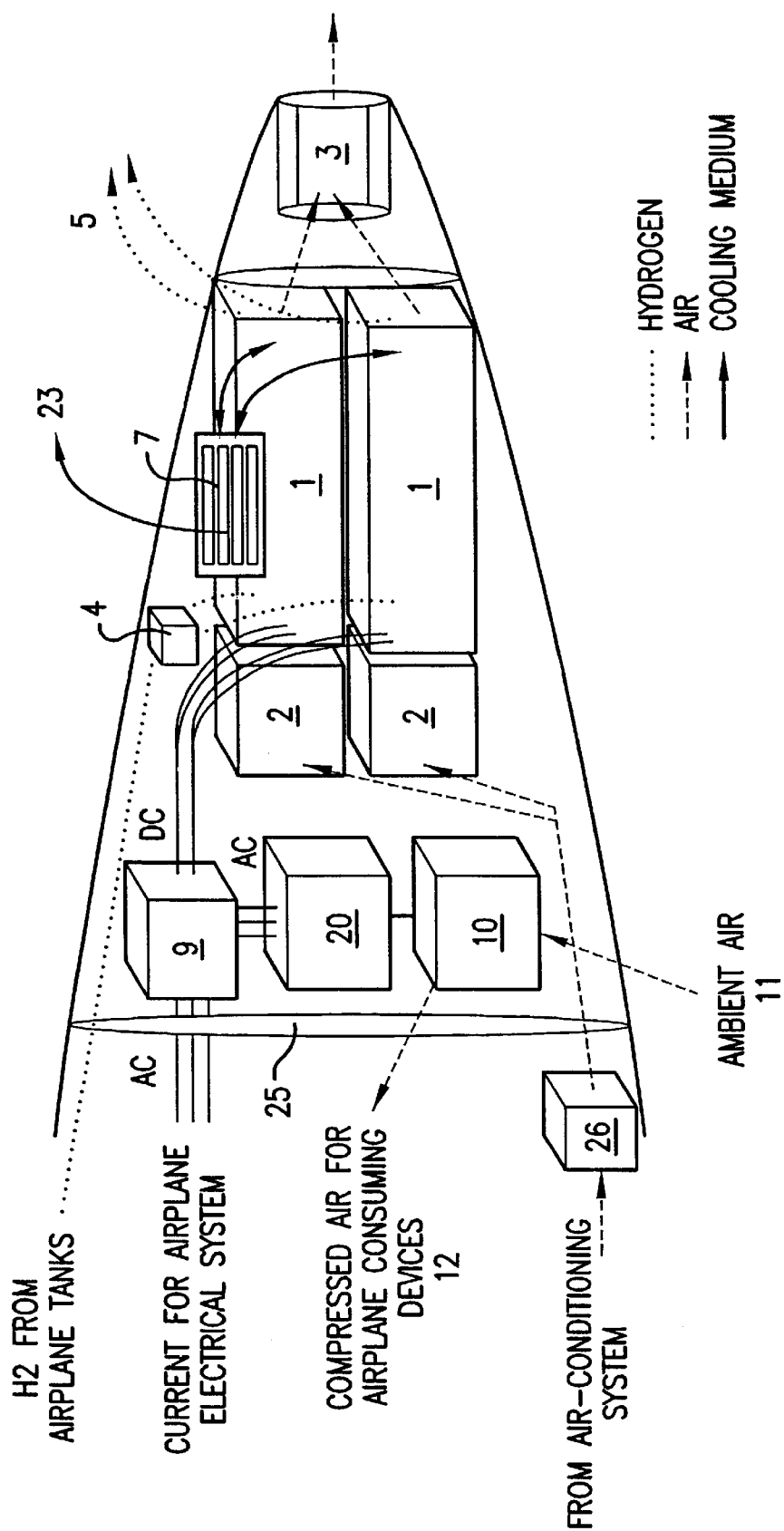
FIG. 2 is a schematic illustration of the arrangement of an auxiliary energy supply system according to FIG. 1.

FIGS. 1 and 2 each show an auxiliary power unit as an example of an energy supply unit according to the invention. FIG. 1 is a conceptual block diagram which shows the interaction of the participating components, while FIG. 2 illustrates a concrete construction of an auxiliary power unit integrated in the tail tip of a passenger plane. The shape of the tail tip illustrated in FIG. 2 corresponds essentially to that of an Airbus A320.

The fuel cell in the energy supply system according to the invention consists essentially of a PEM fuel cell which produces direct current with a high efficiency. For this purpose, the reaction gases, hydrogen and air, are supplied to both sides of a membrane. The resulting reaction heat is carried off at a temperature level of approximately 80° C. by means of a liquid cooling medium. For fluid supply and removal from the fuel cell, three process-type paths (air, hydrogen, cooling medium) are implemented in the fuel cell system.

The following fluid, mechanical or electrical linking points are implemented between the airplane and the fuel cell.

1. Air

In the embodiment illustrated in FIG. 2, two fuel cell modules 1 each comprise one fuel cell stack and one system periphery. An air supply unit 2 connected in front of each fuel cell module 1 comprises particularly a compressor/expander unit for the compression of the air to be supplied to the fuel cell as well as for the energy recovery from the heated air emerging from the fuel cell, an air filter and a sound absorber. The air supply unit 2 is supplied by way of a filter 26 from the outgoing air of the on-board air-conditioning system or by way of an inflow-opening in the airplane shell. The air removal takes place by way of an air outlet unit 3 existing in the airplane tail.

To supply the airplane water system (for example, for the kitchen, the toilets, etc.), water may be obtained from the moist warm outgoing air flow of the fuel cells 1. For this purpose, a water condenser 13 (FIG. 1), which is cooled in the ambient airplane air, is connected into the outgoing air flow. This water condenser 13 precipitates water by a temperature drop of the moist air, which water is supplied to a water tank 15 by means of a condensate trap 14.

2. Hydrogen

Hydrogen is supplied to the fuel cell 1 in gaseous form from containers carried aboard the airplane. Fuel cell waste heat is used to heat the hydrogen supply in the hydrogen heater 4 to the fuel cell temperature. (In the case of future airplane propulsion devices, which use hydrogen as fuel, the hydrogen required for the fuel cell can be obtained directly from the hydrogen tanks of the airplane.) Hydrogen emerging from the fuel cell is removed by means of an outlet pipe 5 from the fuel cell 1 to the airplane shell.

3. Cooling Medium

Outgoing air 23 of the fuel cell 1 is discharged by way of a heat exchanger situated in the fuel cell module 1 and an airplane-side pump 6 (FIG. 1), to another airplane-side heat exchanger 7 with an integrated fan 8 to the airplane environment.

4. Generating Alternating Current

The d.c. supplied by the fuel cell is converted by means of an inverter 9 to the alternating current (approximately 110 V AC) required in the electrical system of the airplane. The electric motor 20 can also be supplied by way of the inverter 9. In the illustrated embodiment, this electric motor 20 drives the compressed-air compressor 10. Its function will be explained hereinafter.

Using fuel cells which are currently available, each of the two fuel cell modules 1 supplies approximately 60 kW at 200 V. Thus, approximately 120 kW of d.c. power can be supplied to the intermediate d.c. circuit. As a comparison: The conventional APU generator currently used in the Airbus A320 supplies approximately 100 kW.

5. Starting of the Fuel Cell

For starting 21 the fuel cell, the fuel-cell-internal starting motor is supplied by way of the electrical system of the airplane, which starting motor starts the fuel cell within approximately 1 second.

6. Compressed-Air Compression

The above-mentioned compressed-air compressor 10 supplies compressed air, for example, for the air-conditioning system of the airplane. In this case, the compressed air drives the compressor of a compressor/expander unit for the air conditioning within the airplane air-conditioning system. Other purposes of the compressed air generated by the compressor 10 are particularly the power unit start and the de-icing. The electric drive 20, which is directly connected with the compressor 10 by way of a shaft, requires electric power of approximately 120 to 150 kW from the fuel cell 1. The electric drive 9 can be cooled by means of a liquid medium. The air supply of the compressor 10 takes place from the ambient air 11 of the airplane, specifically by way of an inflow opening in the airplane shell. The compressed and heated air is supplied to the compressed-air line 12 which is present in the airplane and which leads it to the corresponding consuming device.

In the case of the conventional APU generator of the Airbus A320, an air current of approximately 1 kg/s at 2.5 and at an ambient temperature of 15° C. is currently delivered on the ground by the compressed-air compressor.

7. Fuel Cell Control

The fuel cell 1 is controlled automatically by way of a separate fuel cell control unit 18 (FIG. 1) which is connected with the computer of the airplane by way of the airplane-bus system, and is supplied by way of the electrical system of the airplane.

8. Compartment Ventilation

In order to prevent accumulation of hydrogen in the tail tip and in the fuel cell modules 1 in the event of a defect, a compartment ventilator 19 pulls a defined air current through the whole space of the rear tip (which is bounded by the wall 25) and through the fuel cell module 1.

The use of a fuel cell according to the invention in an APU for an airplane has the following advantages:

No pollutant emissions, which is important particularly for ramp or turnaround positions of the airplane;

significantly less generated noise in comparison to a gas turbine;

higher efficiency (>40% for the fuel cell system, approximately 18% for the whole APU), which results in a lower fuel requirement and therefore possibly saves weight;

it is possible to produce water on board for the kitchen, the toilets and the air conditioning system (moistening of the air);

much lower system costs than conventional APU's (approximately $1,000/kW) are possible;

lower wear and maintenance expenditures as the result of low working temperature (80° C.) and fewer mechanically moved parts (conventional APU: >1,000° C. at the hottest point).

Figure 3:
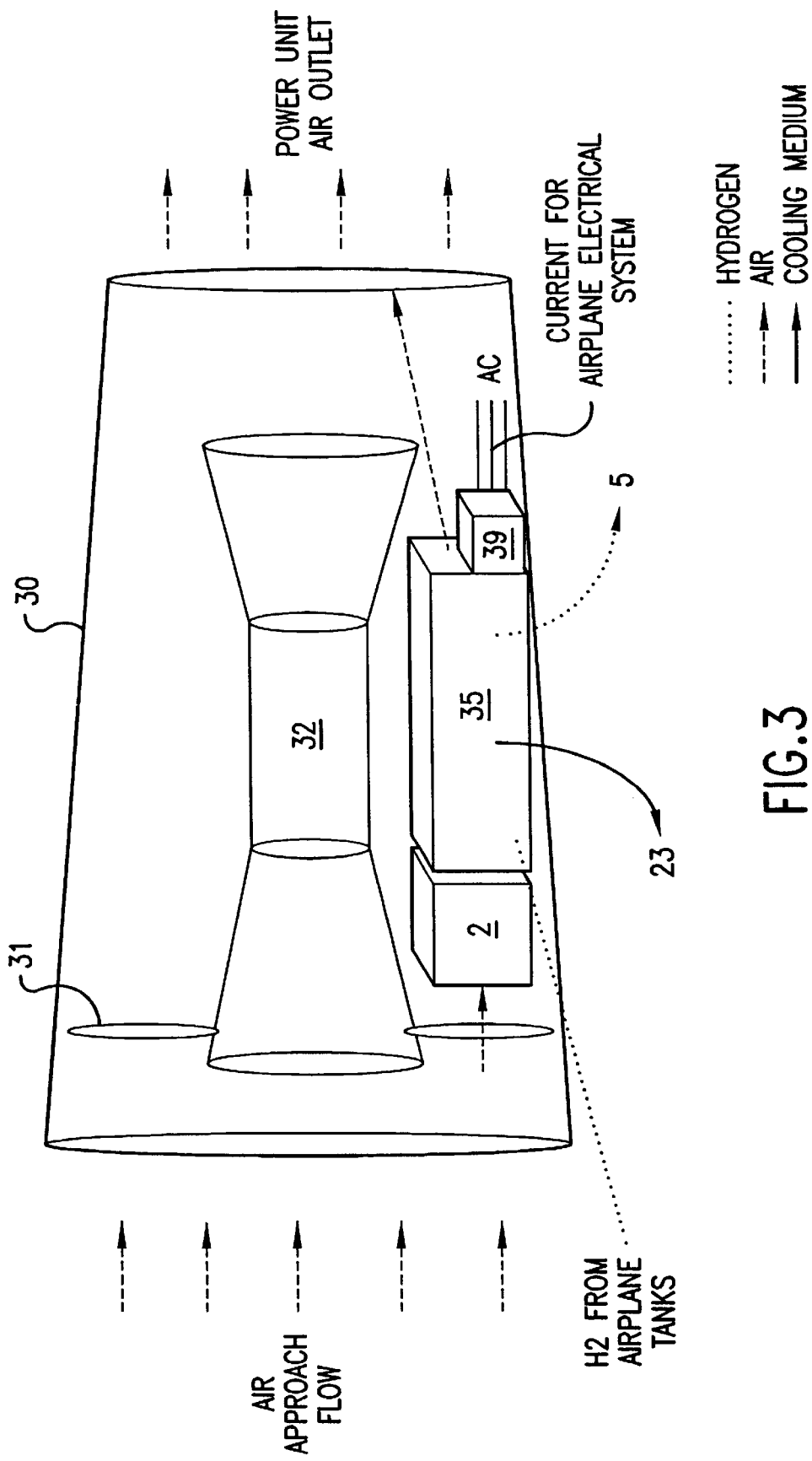
FIG. 3 is a view of another energy supply unit according to the invention, in the form of a main power unit generator.

FIG. 3 illustrates another embodiment of the invention, in which a fuel cell is used in place of the main power unit as a generator for electrical systems of an airplane. The main power unit 30 of the airplane is shown together with the fan 31 and the combustion chamber 32. The fuel cell for generating d.c. electric current is situated within the power unit. An air supply unit 2 is connected in front of the fuel cell 35. The direct current supplied by the fuel cell is converted by means of the inverter 39 to alternating current (approximately 110V AC) required in the electrical system of the airplane.

The fuel cell system according to the invention produces 110V alternating current with a frequency of 400 Hz for the electrical system of the airplane, independently of the operation of the main power unit of the airplane. Thus, another independent current source is available on board the airplane.

The fuel cell may be supplied with air by means of air from the intake opening of the power unit or from the pressure stage of the power unit. The air flowing out of the fuel cell 35 is discharged by way of the outlet of the power unit. Waste heat 23 of the fuel cell 35, like the hydrogen emerging from the fuel cell, is discharged to the airplane environment 5.

Hydrogen is supplied from containers/tanks carried aboard in the airplane. For cooling, starting and controlling the fuel cell, the measures which are described above in conjunction with FIGS. 1 and 2 can be used. As in the case of the systems described in FIGS. 1 and 2, water for the water supply of the airplane can be obtained from the outgoing air flow of the fuel cell. To avoid the accumulation of hydrogen, compartment ventilation may be present.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Energy supply system for an aircraft for replacing at least one of a main power unit generator, an auxiliary power unit, a ram air turbine and an NiCd battery, said energy supply system comprising:

a fuel cell for generating direct current;

means for supplying air to the fuel cell, using one of outgoing air from an aircraft air-conditioning system, ambient air from an intake opening of an aircraft propulsion unit, and ambient air from a pressure stage of the aircraft propulsion unit;

means for recovering water from air discharged from the fuel cell, to obtain water for the water supply of the aircraft, outgoing fuel cell air being discharged to the aircraft environment; and means for discharging hydrogen discharged by the fuel cell to the environment external to the aircraft.

2. The energy supply unit according to claim 1, further comprising an inverter for converting direct current supplied by the fuel cell to alternating current.

3. The energy supply unit according to claim 1, wherein electric current generated by the fuel cell supplies one of the electrical system of the airplane and a radio module of an independent emergency transmitter.

4. The energy supply unit according to claim 1, further comprising an electric drive connected with the alternating current side of the inverter.

5. The energy supply unit according to claim 4, wherein the electric drive drives one of a compressed-air compressor and a hydraulic pump.

6. The energy supply unit according to claim 5, wherein the compressed-air compressor supplies compressed air for one of the air-conditioning system of the aircraft, starting the aircraft power unit, and aircraft de-icing.

7. The energy supply unit according to claim 1, wherein outgoing fuel cell air is discharged by way of an outlet of the aircraft propulsion unit to the environment external to the aircraft.

8. The energy supply unit according to claim 1, wherein the fuel cell is supplied with hydrogen from tanks carried aboard the aircraft.

9. The energy supply unit according to claim 1, wherein the hydrogen supplied to the fuel cell is heated to fuel cell temperature by means of the outgoing air of the fuel cell.

10. The energy supply unit according to claim 1, wherein the hydrogen fed to the fuel cell is generated by means of a hydrogen generating unit on board the aircraft.

11. The energy supply unit according to claim 10, wherein the hydrogen generating unit is a reformer for generating hydrogen from hydrocarbons.

12. The energy supply unit according to claim 1, wherein the fuel cell is a PEM fuel cell.

13. A method of using a fuel cell, comprising:

providing said fuel cell in an aircraft;

coupling said fuel cell to supply electric energy to an electrical supply system of said aircraft; and supplying air to said fuel cell from one of outgoing air from an aircraft air conditioning system, ambient air from an intake opening of an aircraft propulsion unit, and ambient air from a pressure stage of the aircraft propulsion unit.

* * * * *